(12) United States Patent
Ota

(10) Patent No.: US 8,654,257 B2
(45) Date of Patent: Feb. 18, 2014

(54) IMAGE PROCESSING APPARATUS, PROJECTOR, IMAGE PROCESSING METHOD, AND METHOD FOR CONTROLLING IMAGE PROCESSING APPARATUS

(75) Inventor: Katsuya Ota, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1366 days.

(21) Appl. No.: 12/178,297

(22) Filed: Jul. 23, 2008

(65) Prior Publication Data

US 2009/0051816 A1    Feb. 26, 2009

(30) Foreign Application Priority Data

Aug. 24, 2007  (JP) ................. 2007-218002

(51) Int. Cl.
*H04N 5/00* (2011.01)
*H04N 5/64* (2006.01)
*H04N 9/31* (2006.01)

(52) U.S. Cl.
USPC .................... 348/607; 348/618; 348/744

(58) Field of Classification Search
USPC ........................ 348/607, 618, 744
See application file for complete search history.

(56) References Cited

U.S. PATENT DOCUMENTS

| 5,299,002 A | 3/1994 | Funayama |
| 6,285,710 B1 * | 9/2001 | Hurst et al. .................. 348/607 |
| 2002/0108108 A1 * | 8/2002 | Akaiwa et al. .................. 725/86 |
| 2002/0159035 A1 * | 10/2002 | Koyama et al. ................. 353/31 |
| 2003/0058252 A1 * | 3/2003 | Matsuda et al. ............... 345/589 |
| 2005/0084234 A1 * | 4/2005 | Ejiri ............................. 386/125 |
| 2006/0221241 A1 * | 10/2006 | Okumichi et al. ............ 348/607 |
| 2008/0205796 A1 * | 8/2008 | Jonsson ....................... 382/311 |

FOREIGN PATENT DOCUMENTS

| JP | 04-057478 A | 2/1992 |
| JP | 04-354477 A | 12/1992 |
| JP | 06-169437 A | 6/1994 |
| JP | 07-135583 A | 5/1995 |
| JP | 2002-149144 | 5/2002 |
| JP | 2002-149144 A | 5/2002 |
| JP | 2003-008939 A | 1/2003 |
| JP | 2007-036844 A | 2/2007 |

* cited by examiner

*Primary Examiner* — Pankaj Kumar
*Assistant Examiner* — Randy Flynn
(74) *Attorney, Agent, or Firm* — ALG Intellectual Property, LLC

(57) ABSTRACT

An image processing apparatus includes an image signal input unit that receives an input of an image signal representing an image to be displayed, a noise reduction unit that performs noise reduction for reducing the noise contained in the image signal, and an image quality adjustment unit that performs image quality adjustment for adjusting the displayed image quality of the image on the image signal that has undergone the noise reduction.

9 Claims, 6 Drawing Sheets

IMAGE PROCESSING APPARATUS, PROJECTOR, IMAGE PROCESSING METHOD, AND METHOD FOR CONTROLLING IMAGE PROCESSING APPARATUS

BACKGROUND

1. Technical Field

The present invention relates to an image processing apparatus, a projector, an image processing method, and a method for controlling the image processing apparatus for adjusting image quality, such as sharpness correction.

2. Related Art

There has been a projector widely known for a capability to project and display a menu screen for setting parameters for adjusting image quality, such as sharpness, brightness, and contrast, and adjust the displayed image quality of a projected image by prompting a user to manipulate a remote controller or other devices (see JP-A-2002-149144, for example).

There has also been a projector in which a menu screen contains items for turning on and off noise reduction for reducing noise in a video signal to be inputted to the projector and setting the level of the noise reduction, and a user can switch the amount of noise reduction to an instructed value.

JP-A-2002-149144 is an example of related art.

However, for example, when the sharpness parameter is changed to further step up contour enhancement, noise contained in the video signal may also disadvantageously enhanced in some cases. For brightness and contrast, changing parameters thereof may enhance the noise in some cases as well. As described above, when image quality is adjusted in terms of sharpness, brightness, contrast, and other properties, increased, sharper noise components due to the enhancement appear in a projected image, disadvantageously resulting in degradation in image quality.

Further, when a user attempts to adjust image quality to a preferred one in a projector capable of switching the amount of noise reduction to a user instructed value, it is necessary to change parameters for sharpness, brightness, contrast, and other properties in the menu screen and then change the noise reduction setting accordingly. The adjustment operation therefore becomes complicated, and it is hence difficult to adjust the displayed image quality to a preferred one including the noise condition.

SUMMARY

An advantage of some aspects of the invention is to solve at least part of the problems described above, and the invention can be implemented in the following forms or applications.

First Application

An image processing apparatus includes an image signal input unit that receives an input of an image signal representing an image to be displayed, a noise reduction unit that performs noise reduction for reducing the noise contained in the image signal, and an image quality adjustment unit that performs image quality adjustment for adjusting the displayed image quality of the image on the image signal that has undergone the noise reduction.

According to such a configuration, since the image quality adjustment is performed on the image signal that has undergone the noise reduction, it is possible to adjust the displayed image quality and provide an image signal with reduced noise and preferred displayed image quality.

Second Application

The above image processing apparatus further includes a control unit that controls the setting of an image quality adjustment parameter that defines the amount of adjustment in the image quality adjustment operation and the setting of a noise reduction parameter that defines the amount of noise reduction in the noise reduction operation. When the image quality adjustment parameter is changed, the control unit changes the setting of the noise reduction parameter to prevent the increase in noise in association with the change in the image quality adjustment parameter.

According to such a configuration, since the noise reduction prevents the increase in noise in association with the change in the image quality adjustment parameter, it is possible to prevent degradation in image quality when the image quality adjustment parameter is changed.

Third Application

The above image processing apparatus further includes an operation input unit that receives an operation input that instructs the setting of a parameter. When an operation that instructs to change the image quality adjustment parameter is inputted to the operation input unit, the control unit changes the setting of the image quality adjustment parameter in accordance with the input instruction operation and changes the setting of the noise reduction parameter to prevent the increase in noise in association with the change in the image quality adjustment parameter.

According to such a configuration, when an instruction operation that instructs to change the image quality adjustment parameter, it is possible to change the image quality adjustment parameter based on the instruction and prevent degradation in image quality due to the increase in noise in association with the change in the image quality adjustment parameter. The user can therefore readily adjust the displayed image quality to a preferred one by changing the image quality adjustment parameter without considering degradation in image quality due to the noise.

Fourth Application

In the above image processing apparatus, the control unit can control the image quality adjustment based on any one of a plurality of display modes set to adjust the displayed image quality to a predetermined image quality. When an operation that instructs to switch the display mode is inputted to the operation input unit, the control unit changes the setting of the noise reduction parameter to prevent the increase in noise in association with the change in the display mode.

According to such a configuration, since the noise reduction prevents the increase in noise due to the change in the display mode setting, it is possible to prevent degradation in image quality when the display mode is changed.

Fifth Application

In the above image processing apparatus, the image quality adjustment includes at least one of sharpness correction, brightness correction, and contrast correction.

According to such a configuration, it is possible to prevent degradation in image quality when the setting of sharpness correction, brightness correction, or contrast correction is changed.

Sixth Application

A projector includes the image processing apparatus, a light source, a light modulation element that modulates the light from the light source in accordance with an image signal representing the image that has undergone the image quality adjustment and the noise reduction, and a projection unit that projects the modulated light.

According to such a configuration, it is possible to provide a projector capable of preventing degradation in image quality when the image quality adjustment parameter is changed and projecting and displaying an image with preferred image quality.

Seventh Application

In the above projector, the control unit outputs an image signal to the light modulation element, the image signal representing a parameter setting screen for setting the image quality adjustment parameter. When an operation that instructs to change the image quality adjustment parameter in accordance with the projected parameter setting screen is inputted to the operation input unit, the control unit changes the setting of the image quality adjustment parameter in accordance with the instruction operation and changes the setting of the noise reduction parameter to prevent the increase in noise in association with the change in the image quality adjustment parameter.

According to such a configuration, the user can readily adjust the displayed image quality to a preferred one including the noise condition by instructing to change the image quality adjustment parameter through the operation input unit in accordance with the projected and displayed parameter setting screen.

Eighth Application

An image processing method includes receiving an input of an image signal representing an image to be displayed, performing noise reduction for reducing the noise contained in the image signal, and performing image quality adjustment for adjusting the displayed image quality of the image on the image signal that has undergone the noise reduction.

With the above method, since the image quality adjustment is performed on the image signal that has undergone the noise reduction, it is possible to adjust the displayed image quality and provide an image signal with reduced noise and preferred displayed image quality.

Ninth Application

In a method for controlling an image processing apparatus including an image signal input unit that receives an input of an image signal representing an image to be displayed, an image quality adjustment unit that performs image quality adjustment on the image signal, the image quality adjustment adjusting the displayed image quality of the image based on an image quality adjustment parameter that defines the amount of displayed image quality adjustment, and a noise reduction unit that performs noise reduction for reducing the noise contained in the image signal based on a noise reduction parameter that defines the amount of noise reduction, the method includes changing the setting of the image quality adjustment parameter, and changing the setting of the noise reduction parameter to prevent the increase in noise in association with the change in the image quality adjustment parameter.

With the above method, since the noise reduction prevents the increase in noise in association with the change in the image quality adjustment parameter, it is possible to prevent degradation in image quality when the image quality adjustment parameter is changed.

BRIEF DESCRIPTION OF THE DRAWINGS

The invention will now be described with reference to the accompanying drawings, wherein like numbers refer to like elements.

FIG. 5A shows an image quality adjustment menu and FIG. 5B shows a video adjustment menu.

DESCRIPTION OF EXEMPLARY EMBODIMENTS

First Embodiment

A first embodiment according to the invention will be described below with reference to the drawings.

Figure 1:
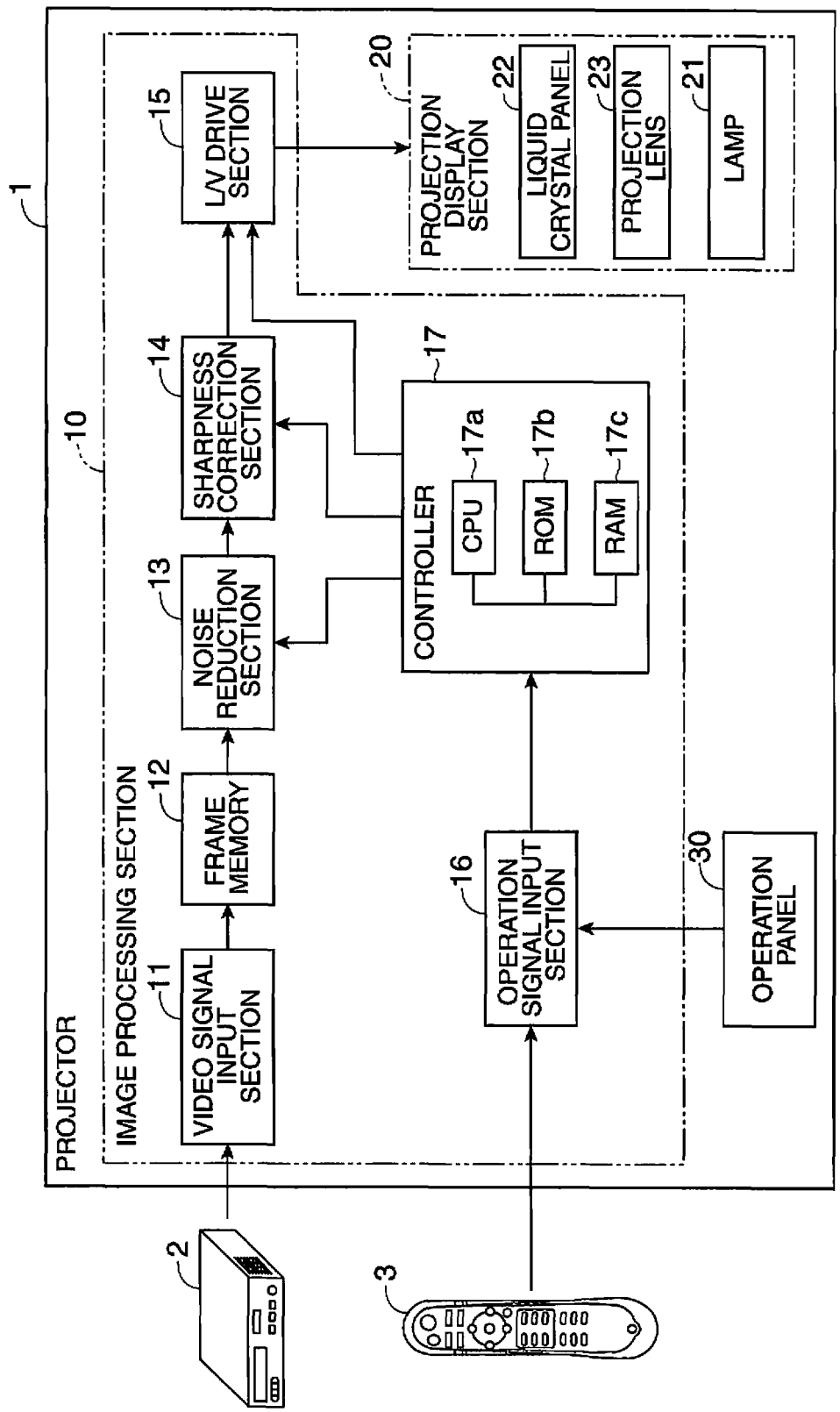
FIG. 1 shows the configuration of a projector according to a first embodiment.

FIG. 1 shows the configuration of a projector according to the first embodiment. As shown in FIG. 1, the projector 1 includes an image processing section (image processing device) 10 that performs a variety of image processing operations on a video signal inputted from a video reproducing apparatus 2, such as a DVD player, a projection display section 20 formed of a lamp (light source) 21, a liquid crystal panel (light modulation element) 22, and a projection lens (projection unit) 23, and an operation panel 30 having a variety of switches through which a user operates the projector 1. An operation remote controller 3 through which the user remotely controls the operation of the projector 1 is provided external to the projector 1. The projector 1 of the embodiment is a so-called front projector, a projector that displays an image by using the liquid crystal panel 22 to modulate the light from the lamp 21 and enlarging and projecting the modulated image light onto a screen, a wall, or other surfaces.

The configuration of the image processing section 10 will be described. The image processing section 10 includes a video signal input section (image signal input unit) 11, a frame memory 12, a noise reduction section (noise reduction unit) 13, a sharpness correction unit (image quality adjustment unit) 14, an L/V drive section 15, an operation signal input section (operation input unit) 16, and a controller (control unit) 17.

The video signal input section 11 is a portion that receives an input of a video signal (image signal) that represents a large number of frame images from the video reproducing apparatus 2 in a time-series order. The video signal input section 11 handles analog inputs, such as a composite signal and a component signal, and digital inputs, such as an HDMI signal. The video signal input section 11 A/D-converts frames of an input video signal as appropriate, and sequentially stores the frame images of the video signal as image data in the frame memory 12.

The noise reduction section 13 is a portion that performs noise reduction on a frame image stored as image data in the frame memory 12. The noise reduction section 13 performs interframe averaging operation on the frame image to be processed using the frame image precedent thereto in the time-series order (that is, the previous frame) to perform three-dimensional noise reduction for reducing temporal noise components contained in the input video signal.

The noise reduction section 13 can switch the amount of noise reduction, that is, the magnitude of noise reduction, to any one of multiple values by changing a weighting factor for the frame image precedent to the frame image being processed in the interframe averaging operation in the three-dimensional noise reduction.

The sharpness correction section 14 is a portion that performs sharpness-correction-based image quality adjustment on the frame image signal that has undergone the noise reduction. In the sharpness correction, displayed image quality sharpness enhancement is performed on the frame image by performing Laplacian-filter-based contour enhancement. Specifically, filtering for combining contour components of an original image detected by a Laplacian filter with the original image is used to produce an image signal of the contour-enhanced frame image.

The sharpness correction section 14 can switch the amount of adjustment, that is, the magnitude of sharpness correction to any one of multiple values by changing a filtering factor for enhancing the contour components.

The L/V drive section 15 is a portion that drives and controls the liquid crystal panel 22 by outputting an image signal representing the image that has undergone the noise reduction and the sharpness correction in a predetermined signal format to the liquid crystal panel 22, which is a light valve.

The operation signal input section 16 receives an input of an operation signal indicative of a switch operation from the operation panel 30, and receives an input of an operation signal indicative of a remote control operation through wireless communication with the operation remote controller 3. The operation signal input section 16 then forwards the input operation signal to the controller 17 to inform the instruction.

The controller 17 is a portion that controls the components of the projector 1 and includes a CPU 17*a*, a ROM 17*b*, and a RAM 17*c*. The ROM 17*b* stores a control program. The CPU 17*a* reads the control program from the ROM 17*b* and executes it to carry out a variety of processes, including a process of controlling the L/V drive section 15 to project and display a variety of menu screens and a process of switching the noise reduction setting and the sharpness correction setting to those according to the operation signal inputted to the operation signal input section 16.

Figure 2:
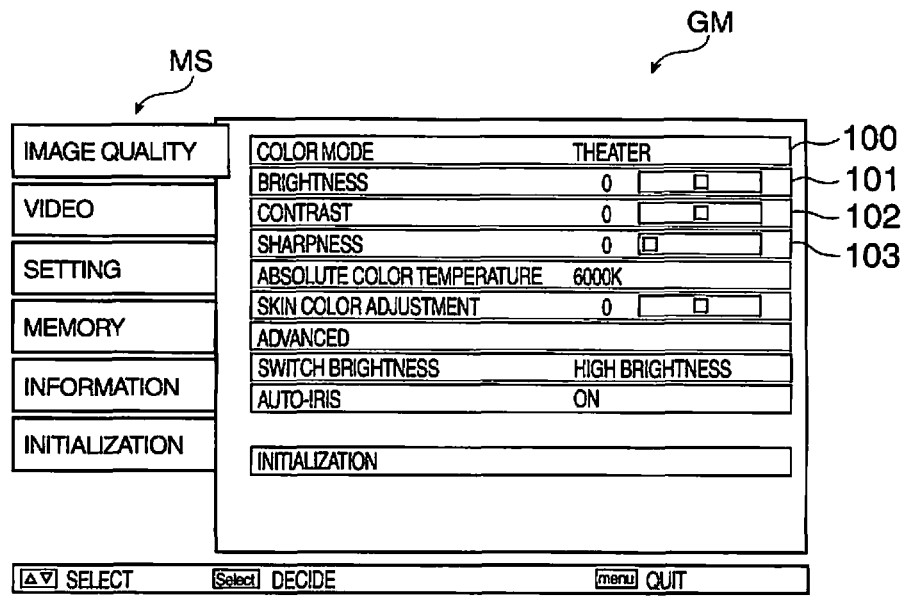
FIG. 2 shows an exemplary image quality adjustment menu screen.

FIG. 2 shows an image quality adjustment menu screen, which is one of the menu screens. The image quality adjustment menu screen GM is projected and displayed under the control of the controller 17 when the user presses a predetermined switch provided on the operation remote controller 3 and the operation panel 30. The image quality adjustment menu screen GM includes setting fields for a variety of displayed image quality setting items, such as a color mode setting field 100, a brightness setting field 101, a contrast setting field 102, and a sharpness setting field 103 as well as a menu selecting field MS. In the color mode setting field 100, one mode can be selected from a plurality of modes, such as a "living room mode" and a "theater mode" that correspond to applications of the projector 1. In each of the brightness, contrast, and sharpness setting fields 101 to 103, the image quality adjustment parameter can be set to any one of 21 steps, "0 to 20," and the figure indicative of the thus set parameter value is displayed. The menu selecting field MS displays a variety of items for switching the type of the menu screen to any one of "image quality," "video," and other types.

Figure 3:
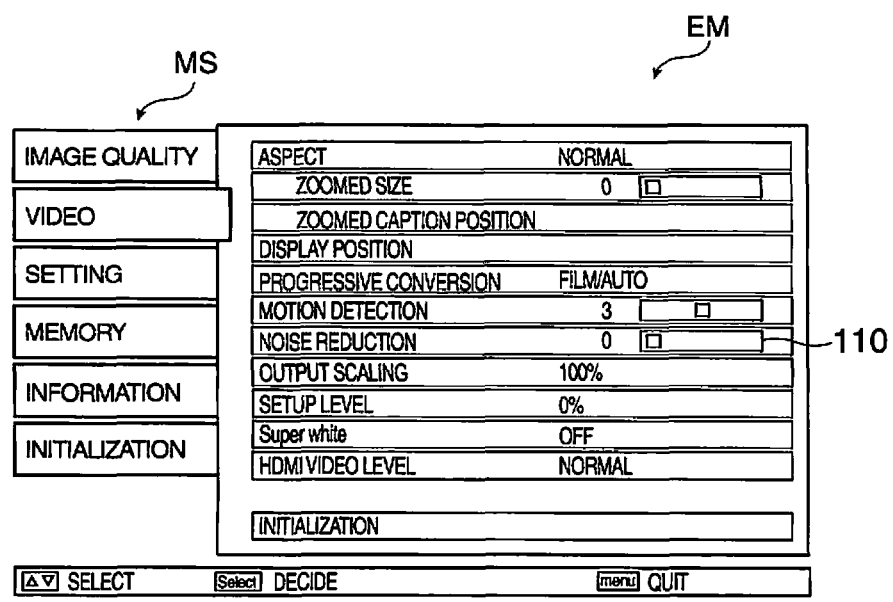
FIG. 3 shows an exemplary video adjustment menu screen.

FIG. 3 shows a video adjustment menu screen. The video adjustment menu screen EM is displayed when the user operates the operation remote controller 3 or the operation panel 30 to select the item "video" in the menu selecting field MS and switch the type of the menu screen. The video adjustment menu screen EM includes a variety of setting fields for the aspect ratio of the screen and other parameters, and a noise reduction setting field 110. In the noise reduction setting field 110, the noise reduction parameter can be set to any one of 21 steps, "0" to "20", as in some of the setting fields in the image quality adjustment menu screen GM.

The user can set the brightness, contrast, and sharpness image quality adjustment parameters as well as the noise reduction parameter to desired values by operating switches on the operation remote controller 3 or the operation panel 30 in accordance with the menu screen projected and displayed by the projector 1. The controller 17 calculates setting values that correspond to the thus set image quality adjustment parameters and the noise reduction parameter and applies the setting values to the noise reduction section 13 and the sharpness correction section 14. That is, weight factors used in the interframe averaging operation in the three-dimensional noise reduction are calculated and set to the noise reduction section 13, and filtering factors for contour components to be combined with the original image in the sharpness correction are calculated and set to the sharpness correction section 14. In this way, image quality adjustment and noise reduction are carried out in accordance with the parameters set by the user in the menu screens.

For example, when the user changes the image quality adjustment parameter in the sharpness setting field 103 in the image quality adjustment menu screen GM, for example, from "0" to "20", so as to instruct to carry out stronger contour-enhancement-based sharpness correction, noise components contained in a frame image also undergo the contour enhancement, so that the noise contained in the input video signal is enhanced and hence increased. To address such a problem, when the user changes the sharpness correction-related image quality adjustment parameter to instruct to perform stronger sharpness correction, the controller 17 controls and changes the noise reduction setting to perform stronger noise reduction in order to prevent increase in noise. The processes to be carried out by the controller 17 in response to the change in the setting made in the menu screen will be described below in detail with reference to the flowchart shown in FIG. 4.

Figure 4:
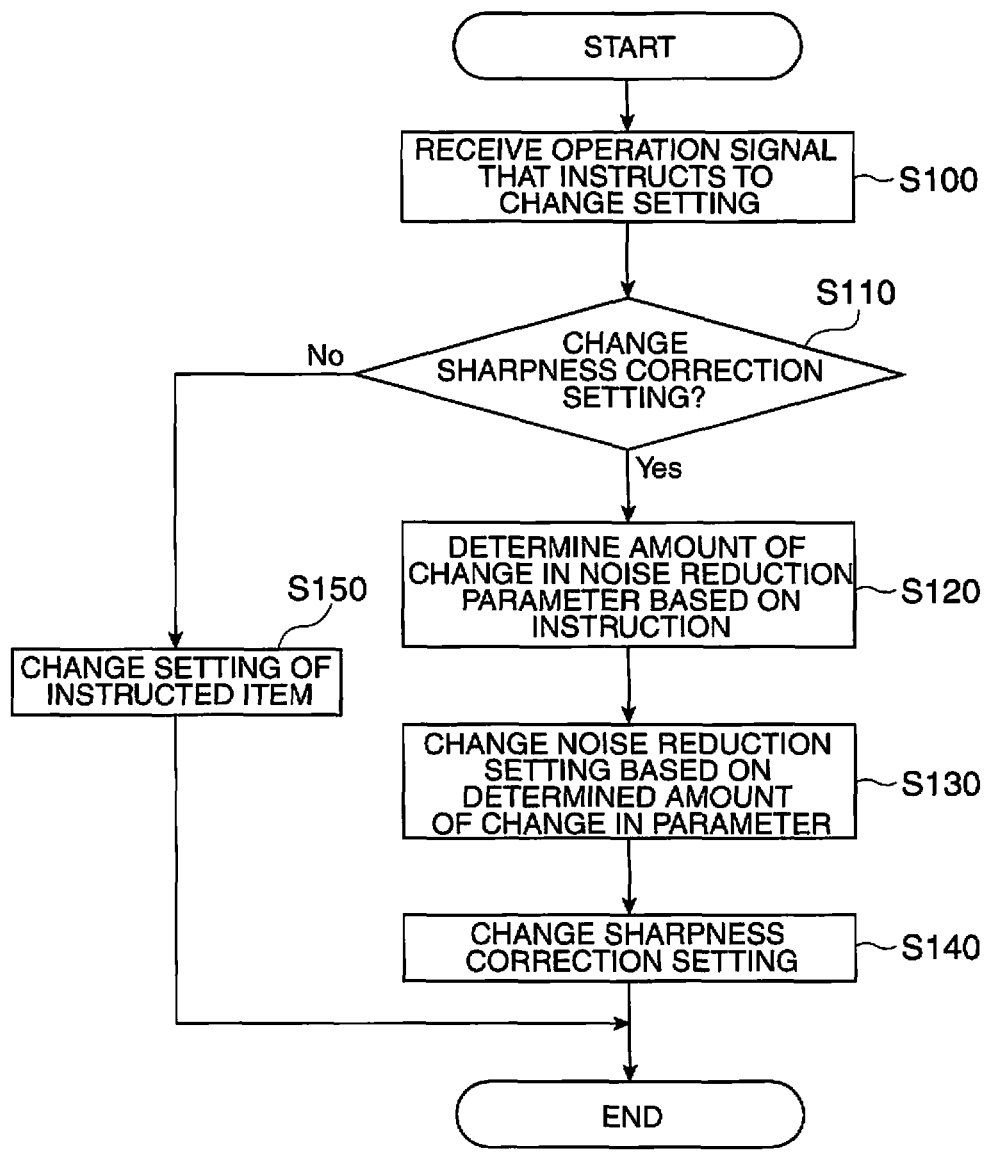
FIG. 4 is a flowchart showing the flow of processes carried out by a controller in accordance with the change in setting made in a menu screen.

When the user operates the operation remote controller 3 or the operation panel 30 to instruct to change the setting in the image quality adjustment menu screen GM, and an operation signal is inputted to the operation signal input section 16, the processes shown in FIG. 4 are initiated. The controller 17 receives the operation signal that instructs to change the setting from the operation signal input section 16 (step S100), and judges whether or not the received operation signal instructs to change the sharpness correction setting (step S110).

When the operation signal instructs to change the sharpness correction setting (step S110: Yes), the amount of change in the noise reduction parameter is determined based on the operation signal instruction (step S120). In this step, when the setting is changed to increase the value of the sharpness correction-related image quality adjustment parameter, stronger sharpness correction is carried out and hence the noise is amplified. Therefore, the value of the noise reduction parameter is increased to increase the amount of noise reduction obtained in the noise reduction operation. When the setting is changed to decrease the value of the sharpness correction-related image quality adjustment parameter, the value of the noise reduction parameter is decreased in accordance with the amount of change in the sharpness correction parameter. In this process, the amount of change in the noise reduction parameter may be determined in such a way that the ratio of the amount of change in the noise reduction parameter to the amount of change in the sharpness correction parameter is a predetermined fixed value, or may be determined in accordance with a table that relates in advance the amount of change in the sharpness correction parameter to the amount of change in the noise reduction parameter.

After the amount of change in the noise reduction parameter has been thus determined, the controller 17 changes the noise reduction setting based on the amount of change in the parameter thus determined (step S130). In this step, the controller 17 uses the amount of change in the parameter determined in the step S120 to calculate the weight factor used in the interframe operation in the noise reduction operation and sets the thus set weight factor in the noise reduction section 13. A new setting is thus applied to the noise reduction section 13.

The controller 17 then changes the sharpness correction setting, which is the adjustment item instructed above (step S140). In this step, the instruction from the user is used to calculate the filtering factor for the sharpness correction and the thus set filtering factor is set in the sharpness correction section 14. A new setting is thus applied to the sharpness correction section 14. After the process in the step S140 has been completed, the processes shown in FIG. 4 are terminated.

On the other hand, in the step S110, when the operation signal does not instruct to change the sharpness correction setting (step S110: No), the setting of the adjustment item instructed above is changed (step S150), and the processes shown in FIG. 4 are terminated.

Figure 5A:
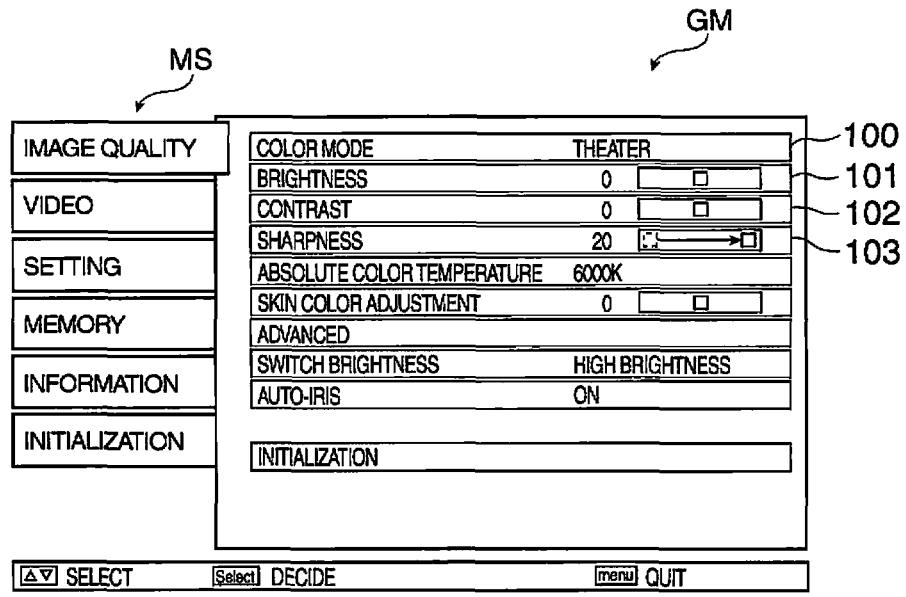
FIGS. 5A and 5B explain menu screens before and after the change in setting.
Figure 5B:
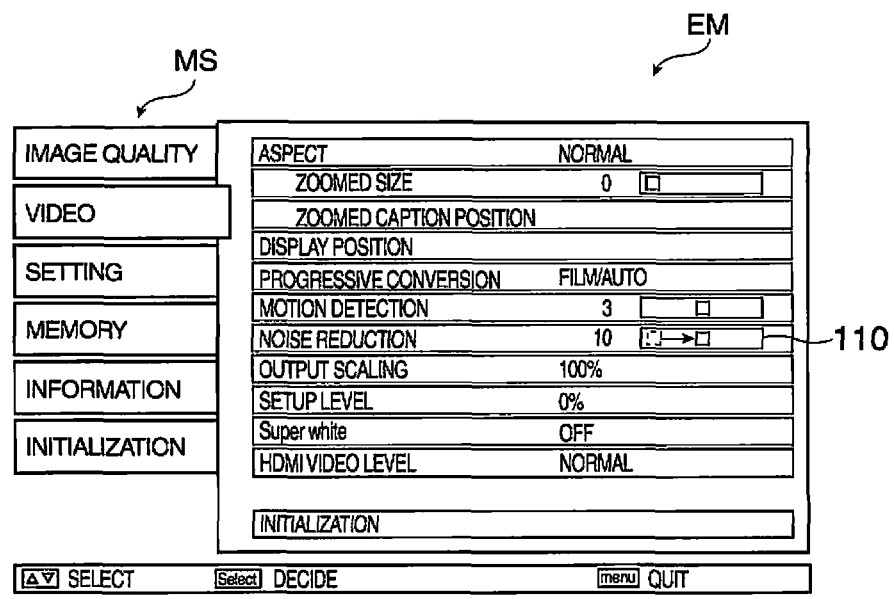

As described above, in the projector 1, when the sharpness setting is changed in the image quality adjustment menu screen GM, the noise reduction setting is changed. That is, the noise reduction setting is changed in synchronization with the change in the sharpness setting. For example, as shown in FIG. 5A, in the image quality adjustment menu screen GM, when the user operates the operation remote controller 3 or the operation panel 30 to change the sharpness correction parameter from "0" to "20", in the subsequently displayed video adjustment menu screen EM, the noise reduction parameter "0", which is the value before the change in the setting, is changed as shown in FIG. 5B to a value reflecting the change in the sharpness correction setting ("10" in the example shown in FIG. 5B).

The processes performed by the image processing section 10 on an input video signal will be described below with reference to the flowchart shown in FIG. 6.

Figure 6:
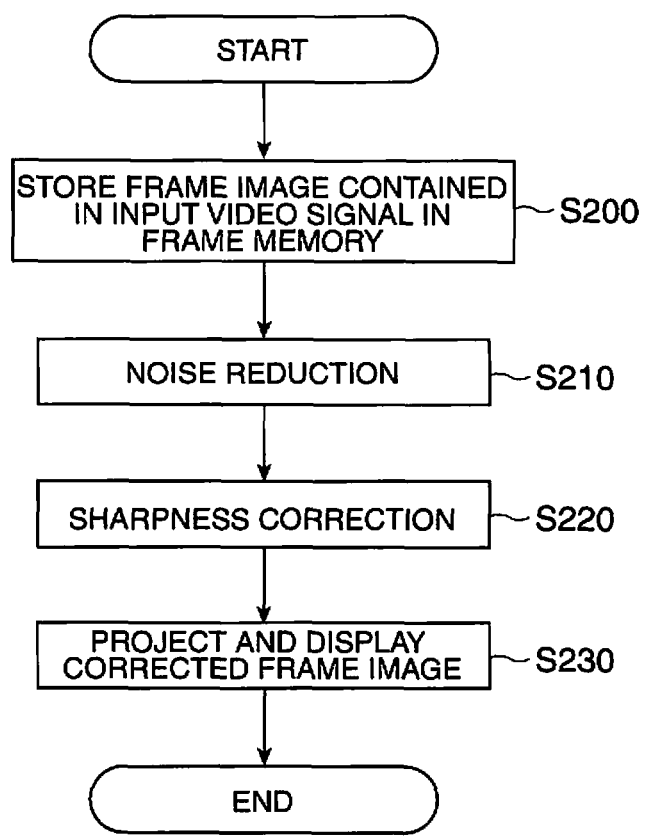
FIG. 6 is a flowchart showing the flow of processes performed on an input video signal by an image processing section.

When a video signal is inputted from the video reproducing apparatus 2 to the video signal input section 11, the processes shown in FIG. 6 are performed on each frame image in the successively inputted video signal. When the processes shown in FIG. 6 are initiated, the video signal input section 11 first converts the frame image being processed that is represented by the input video signal into image data and stores them in the frame memory 12 (step S200).

The noise reduction section 13 then reads the image data of the frame image from the frame memory 12 and performs noise reduction in accordance with the set value informed from the controller 17 in step S130 (step S210). In this step, the data of the frame image being processed are read from the frame memory 12, and the data of the frame image precedent to the frame image being processed in the time-series order are read from the frame memory 12. The two frame images are used to perform the noise reduction. The noise reduction section 13 then outputs an image signal representing the image that has undergone the noise reduction to the sharpness correction section 14.

The sharpness correction section 14 performs sharpness correction, that is, contour enhancement, on the image signal that has undergone the noise reduction in accordance with the setting informed from the controller 17 in the step S140 (step S220). The sharpness correction section 14 then outputs the image signal that has undergone the sharpness correction to the L/V drive section 15.

The L/V drive section 15 converts the image signal that has undergone the sharpness correction into an image signal in a predetermined format for driving the liquid crystal panel 22 and outputs the resultant image signal to the liquid crystal panel 22 so as to project and display the frame image that has undergone the sharpness correction (step S230). After the process in the step S230 has been completed, the processes shown in FIG. 6 are terminated.

Advantageous effects of the first embodiment will be described below.

1. When the user operates the operation remote controller 3 or the operation panel 30 to change the sharpness correction setting in the image quality adjustment menu screen GM so as to carry out stronger sharpness correction, the noise reduction setting is changed in synchronization with the change in the sharpness correction setting so as to carry out stronger noise reduction. Since increase in noise components due to the sharpness correction is thus prevented, it is possible to project and display a sharp image with an enhanced contour, reduced noise, and preferable displayed image quality.

2. When the user operates the operation remote controller 3 or the operation panel 30 to change the sharpness correction setting in the image quality adjustment menu screen GM, the amount of noise that changes in response to the change in the sharpness correction setting is reduced without changing the noise reduction setting. The user can thus readily adjust the image quality to a preferred one including the noise condition by changing the sharpness correction setting without considering the change in the noise reduction setting.

Second Embodiment

A second embodiment will be described below. In the second embodiment, the noise reduction setting is changed in synchronization with the change in the color mode (display mode). In the following description, the components similar to those in the first embodiment have the same reference characters, and no detailed description thereof will be made.

Figure 7:
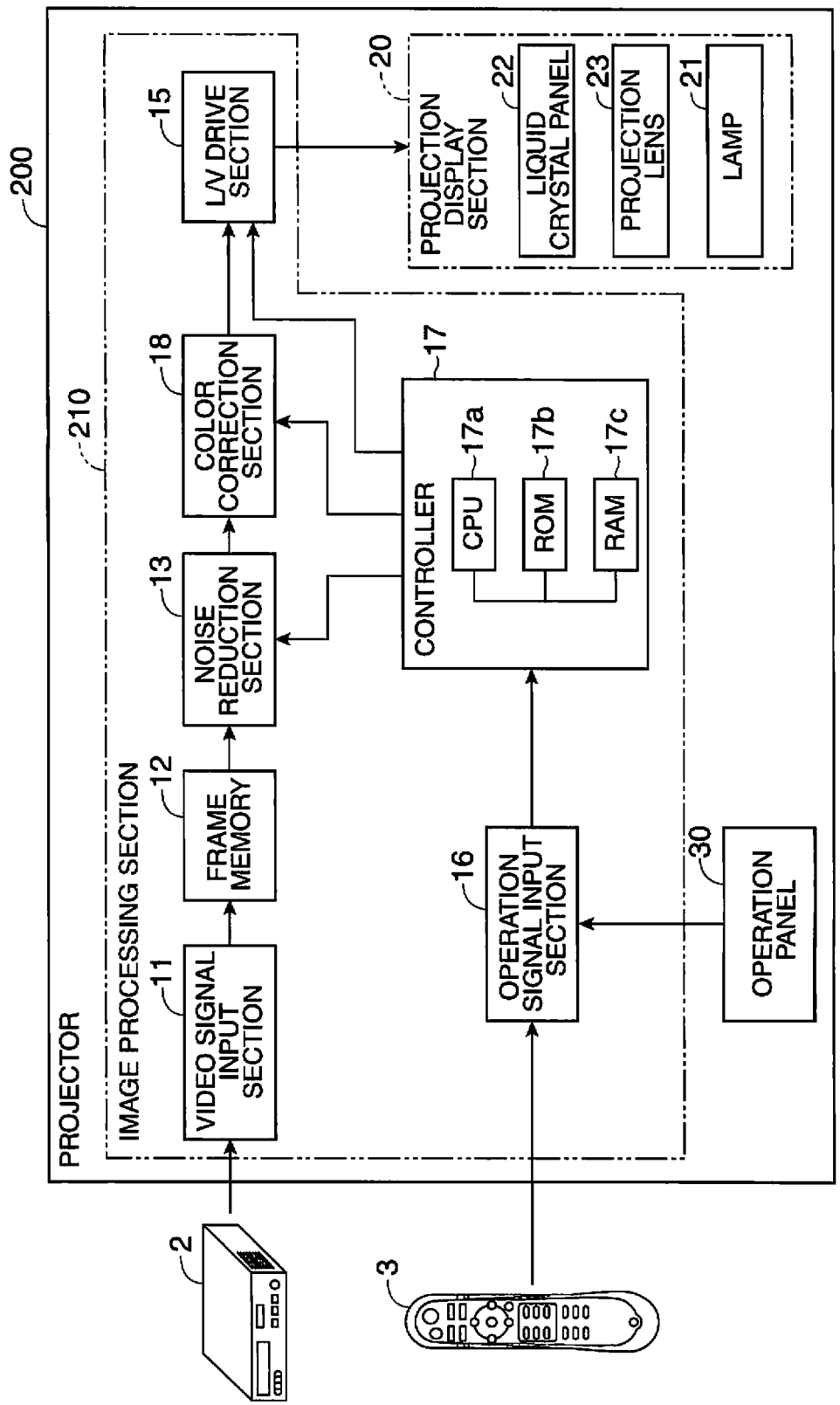
FIG. 7 shows the configuration of a projector according to a second embodiment.

FIG. 7 shows the configuration of a projector according to the second embodiment. As shown in FIG. 7, an image processing section 210 of a projector 200 includes a video signal input section 11, a frame memory 12, a noise reduction section 13, a color correction section 18, an L/V drive section 15, an operation signal input section 16, and a controller 17. That is, the projector 200 is configured to have the color correction section 18 instead of the sharpness correction section 14 in the projector 1 of the first embodiment.

The color correction section 18 has color correction tables (not shown) that correspond to a plurality of color modes, such as a "living room mode" and a "theater mode," and uses a color correction table that corresponds to the color mode selected in the color mode setting field 100 in the image quality adjustment menu screen GM to perform color correction. For example, the "living room mode" is intended for a relatively bright environment, such as a living room. In the "living room mode," color adjustment is made to provide a relatively bright image visible even in a bright environment. On the other hand, the "theater mode" is intended for a dark environment, such as a dark room. In the "theater mode," color adjustment is made to provide an image in which a higher priority is placed on color than brightness as compared to the "living room mode," and the amount of light emitted from the lamp 21 is reduced to adjust the image quality to be more suitable for a dark environment. That is, the displayed image quality can be adjusted to be suitable for a particular application by changing the color mode in accordance with applications.

When the color mode setting is changed, the brightness and other conditions of the projected image are changed accordingly, resulting in increased noise that appears in the projected image and hence degraded image quality in some cases. To address such a problem, the controller 17 changes the noise reduction setting in such a way that increase in noise due to the change in the color mode setting is prevented when the user operates the operation remote controller 3 or the operation panel 30 to change the color mode setting in the image quality adjustment menu screen GM. In the "living room mode," for example, since the projected image is bright and hence the noise likely appears with an increased intensity, the setting is changed to perform stronger noise reduction.

According to the second embodiment, it is possible to prevent degradation in image quality due to the noise that appears in a projected image when the color mode is changed, and project and display an image with less noise and preferable image quality.

The first and second embodiments according to the image processing apparatus and the projector of the invention have been described. The image processing apparatus and the projector are not limited to those in the first and second embodiments, but may be implemented in a variety of aspects. Modifications will be described below.

First Modification

In the first embodiment described above, the noise reduction setting is changed in synchronization with the change in the sharpness correction-related image quality adjustment parameter. The noise reduction setting may also be changed in synchronization with the change in other image quality adjustment parameters, such as brightness and contrast. In this way, it is possible to prevent degradation in displayed image quality, when the noise contained in a video signal is increased due to brightness or contrast correction, by changing the noise reduction setting in synchronization therewith. Further, the first embodiment is not necessarily configured in such a way that the noise reduction setting is changed in synchronization with a single setting item, but the noise reduction setting is changed in synchronization with a plurality of setting items selected from sharpness, brightness, and contrast.

Second Modification

In the first embodiment described above, the sharpness correction setting and the noise reduction setting can be changed by specifying any of the parameters "0" to "20" in the menu screen. The settings may be alternatively changed, for example, by selecting one of a plurality of options that correspond to the degree of correction, such as "off," "weak correction," and "strong correction."

Third Modification

In the first and second embodiments described above, the user operates the operation panel or the operation remote controller to change any of the settings, but the way of changing the setting is not limited thereto. For example, when the projector is configured to judge the type of the video signal and change the sharpness correction setting in accordance with the type of the video signal, the noise reduction setting may be changed in synchronization with the change in the sharpness correction setting.

Fourth Modification

In the above embodiments, a Laplacian filter is used to perform contour enhancement in the sharpness correction, but the way of performing sharpness correction is not limited thereto. For example, a median filter, a Sobel filter, or a Prewitt filter may be used to perform contour enhancement.

Fifth Modification

In the above embodiments, three-dimensional noise reduction is carried out by using the frame precedent to the frame being processed in the time-series order, but the three-dimensional noise reduction may be carried out by using the frames precedent and subsequent to the frame being processed. Further, as the method for reducing noise components, for example, noise reduction using a low pass filter may be used to remove noise-related high-frequency components.

Sixth Modification

The above embodiments have been described with reference to a front projector using a liquid crystal panel. Similarly, in a rear projector and an all-in-one projector with a built-in DVD reproducing device, the noise reduction setting may be synchronized with image quality adjustment. Further, the image processing apparatus of the invention may be applied to other display apparatus, such as a DLP®, a liquid crystal display, an organic EL display, a plasma display, a CRT (Cathode Ray Tube), an FED (Field Emission Display), and an SED (Surface-Conduction Electron-Emitter Display).

The entire disclosure of Japanese Patent Application Nos: 2007-218002, filed Aug. 24, 2007 is expressly incorporated by reference herein.

What is claimed is:

1. An image processing apparatus comprising:
an image signal input unit that receives an input of an image signal representing frame images to be displayed;
a noise reduction unit that performs noise reduction for reducing the noise contained in the image signal, the noise reduction utilizing an interframe averaging operation that is performed on a frame image to be processed using a frame image precedent to the frame image to be processed;
an image quality adjustment unit that performs image quality adjustment for adjusting the displayed image quality of a frame image on the image signal that has undergone the noise reduction; and
a control unit that controls the setting of an image quality adjustment parameter that defines the amount of adjustment in the image quality adjustment operation and the setting of a noise reduction parameter that defines the amount of noise reduction in the noise reduction operation,
wherein:
when the image quality adjustment parameter is changed, the control unit changes the setting of the noise reduction parameter to prevent the increase in noise in association with the change in the image quality adjustment parameter, and
an amount of change in the noise reduction parameter is used to calculate a weight factor utilized in the interframe averaging operation.

2. The image processing apparatus according to claim 1, further comprising an operation input unit that receives an operation input that instructs the setting of a parameter,
wherein when an operation that instructs to change the image quality adjustment parameter is inputted to the operation input unit, the control unit changes the setting of the image quality adjustment parameter in accordance with the input instruction operation and changes the setting of the noise reduction parameter to prevent the increase in noise in association with the change in the image quality adjustment parameter.

3. The image processing apparatus according to claim 2, wherein the control unit can control the image quality adjustment based on any one of a plurality of display modes set to adjust the displayed image quality to a predetermined image quality, and
when an operation that instructs to switch the display mode is inputted to the operation input unit, the control unit changes the setting of the noise reduction parameter to prevent the increase in noise in association with the change in the display mode.

4. The image processing apparatus according to claim 1, wherein the image quality adjustment includes at least one of sharpness correction, brightness correction, and contrast correction.

5. A projector comprising:
the image processing apparatus according to claim 1;
a light source;
a light modulation element that modulates the light from the light source in accordance with an image signal representing the image that has undergone the image quality adjustment and the noise reduction; and
a projection unit that projects the modulated light.

6. The projector according to claim 5,
wherein the control unit outputs an image signal to the light modulation element, the image signal representing a parameter setting screen for setting the image quality adjustment parameter, and
when an operation that instructs to change the image quality adjustment parameter in accordance with the projected parameter setting screen is inputted to the operation input unit, the control unit changes the setting of the image quality adjustment parameter in accordance with the instruction operation and changes the setting of the noise reduction parameter to prevent the increase in noise in association with the change in the image quality adjustment parameter.

7. An image processing method comprising:
receiving an input of an image signal representing frame images to be displayed;
performing noise reduction for reducing the noise contained in the image signal, the noise reduction utilizing an interframe averaging operation that is performed on a frame image to be processed using a frame image precedent to the frame image to be processed;
performing image quality adjustment for adjusting the displayed image quality of a frame image on the image signal that has undergone the noise reduction; and
controlling the setting of an image quality adjustment parameter that defines the amount of adjustment in the image quality adjustment operation and the setting of a noise reduction parameter that defines the amount of noise reduction in the noise reduction operation,
wherein:
when the image quality adjustment parameter is changed, the setting of the noise reduction parameter is changed to prevent the increase in noise in association with the change in the image quality adjustment parameter, and
an amount of change in the noise reduction parameter is used to calculate a weight factor utilized in the interframe averaging operation.

8. A method for controlling an image processing apparatus including:
an image signal input unit that receives an input of an image signal representing frame images to be displayed,
an image quality adjustment unit that performs image quality adjustment on the image signal, the image quality adjustment adjusting the displayed image quality of a frame image based on an image quality adjustment parameter that defines the amount of displayed image quality adjustment, and
a noise reduction unit that performs noise reduction for reducing the noise contained in the image signal based on a noise reduction parameter that defines the amount of noise reduction, the noise reduction utilizing an interframe averaging operation that is performed on a frame image to be processed using a frame image precedent to the frame image to be processed,
the method comprising:
changing the setting of the image quality adjustment parameter; and
changing the setting of the noise reduction parameter to prevent the increase in noise in association with the change in the image quality adjustment parameter,
wherein:
when the image quality adjustment parameter is changed, the setting of the noise reduction parameter is changed to prevent the increase in noise in association with the change in the image quality adjustment parameter, and
an amount of change in the noise reduction parameter is used to calculate a weight factor utilized in the interframe averaging operation.

9. The image processing apparatus according to claim 1, wherein the interframe averaging operation is further performed on a frame image to be processed using a frame image subsequent to the frame image to be processed.

* * * * *